United States Patent [19]

Karban et al.

[11] 4,376,874

[45] Mar. 15, 1983

[54] REAL TIME SPEECH COMPACTION/RELAY WITH SILENCE DETECTION

[75] Inventors: Steven H. Karban, Apple Valley; James V. Drexler, St. Paul; Cleon L. Hennen, Burnsville, all of Minn.

[73] Assignee: Sperry Corporation, New York, N.Y.

[21] Appl. No.: 216,031

[22] Filed: Dec. 15, 1980

[51] Int. Cl.³ .............................................. G10L 1/00
[52] U.S. Cl. .................................. 179/15.55 T; 360/8
[58] Field of Search ........... 179/1 SC, 15.55 T, 1 VC; 360/8; 369/50; 358/128.6, 260, 261; 340/148

[56] References Cited

U.S. PATENT DOCUMENTS

| | | | |
|---|---|---|---|
| 4,091,242 | 5/1978 | Carrubba et al. | 179/15.55 T |
| 4,093,831 | 6/1978 | Sharp et al. | 369/50 |
| 4,130,739 | 12/1978 | Patten | 369/50 |
| 4,277,645 | 7/1981 | May | 179/1 SC |
| 4,280,192 | 7/1981 | Moll | 179/15.55 T |
| 4,281,218 | 7/1981 | Chuang et al. | 179/1 VC |

Primary Examiner—Emanuel S. Kemeny
Attorney, Agent, or Firm—Douglas L. Tschida; Kenneth T. Grace; Marshall M. Truex

[57] ABSTRACT

Speech compaction/replay apparatus for real time monitoring speech and filtering out periods of relative slence from a recording of the speech. The recording also containing synchronization and time code information for ensuring that on replay and in terms of real time the audio output will essentially replicates the analog speech input. The apparatus and technique minimizing the amount of storage media required to store the speech.

15 Claims, 11 Drawing Figures

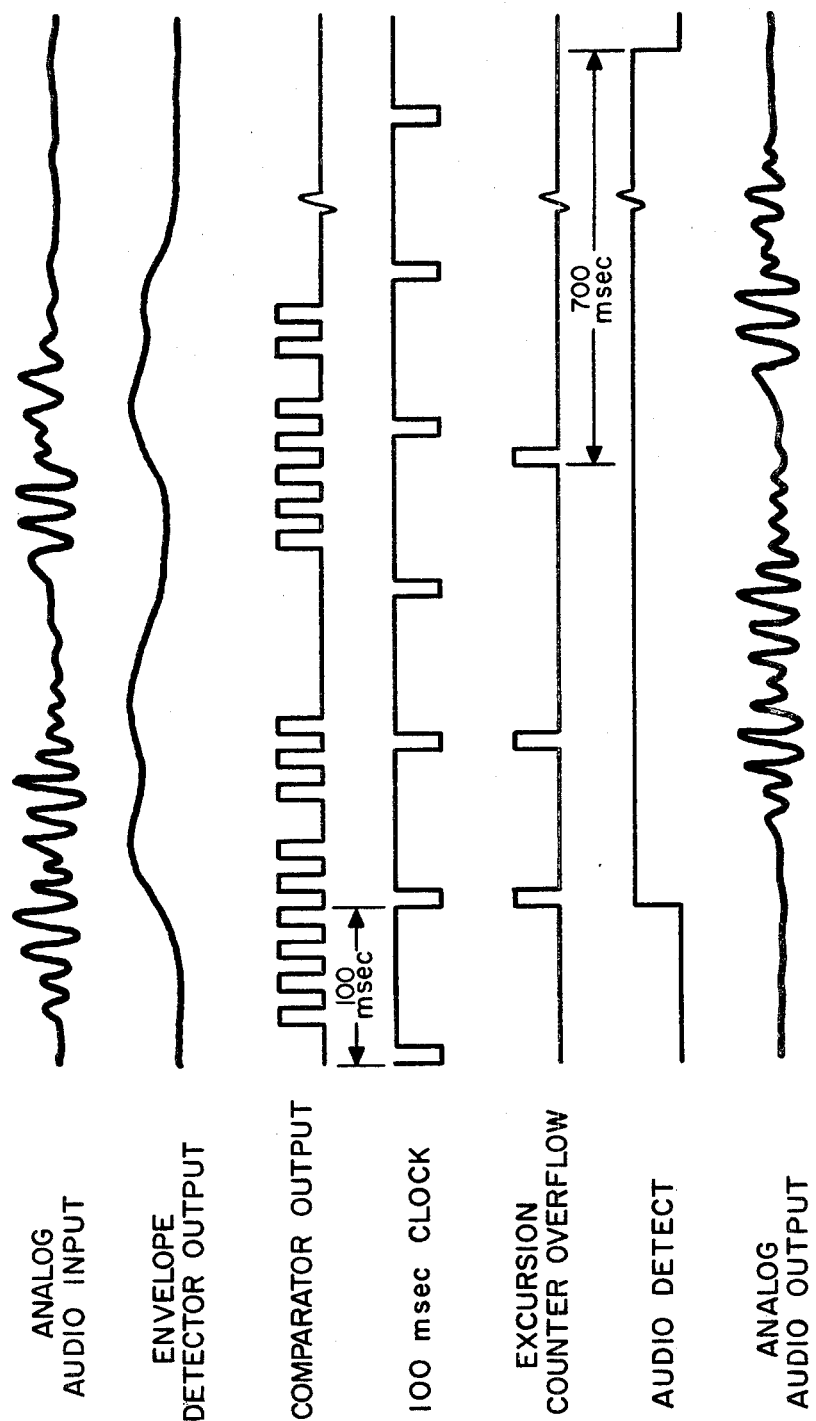

REAL TIME SPEECH COMPACTION/RELAY WITH SILENCE DETECTION

BACKGROUND OF THE INVENTION

The present invention relates to apparatus and a method for minimizing the amount of storage media required to contain vocalized speech. In particular the invention relates to real time silence detection/replay apparatus for monitoring an analog signal to detect and remove silent periods prior to recording the analog speech and for inserting the silence in synchronization on replay.

While many methods exist for reducing audio storage requirements via analog and/or digital compression and related encoding/decoding techniques, and while an encoding/decoding method similar to the present method was disclosed by Boies et al in IBM Technical Bulletin, Vol. 19, No. 6, November, 1976, pp. 2357-2358, the present method and apparatus are distinguishable in that instead of sampling a digitized (i.e. encoded) input, the present apparatus permits the direct sampling and editing of the received analog signal in parallel with receipt of the analog signal. Thus, producing a silence free output, independent of the encoding scheme (if any), and providing greater utility to the concept.

Additional distinctions in the apparatus can be found in the replay apparatus which on replay adjusts the level of the silent period to the ending level of the previous audio period, thereby preventing popping noises on replay. The silence detector is also distinguishable in that it continuously adjusts the level of the threshold envelope; performs numerous comparisons during each sampling period; and upon detecting a silent period, ensures that a sync and time code signal are inserted into the recorded speech so that upon replay the silent periods will occur in real time (i.e. with respect to total elapsed time from the initialization of the system) as opposed to delta time (i.e. with respect to the previous audio period). The silence detector is further distinguishable in that automatic gain control and background noise filters have been included to improve the performance of the silence detector.

Additional disclosures of specific "silence or stop" detecting means can be found in Thurston, U.S. Pat. Nos. 3,646,576 and 3,846,586 (i.e. selecting one of six outputs depending on the duration of the stop). Another minim detector that samples the number of times a minimum level is exceeded and that updates the threshold depending on the previous sample is taught in Araseki et al, U.S. Pat. No. 4,167,653. In particular Araseki discloses a speech detector with a threshold setting element containing an integrator for adjusting the threshold setting depending on the number of samples that have exceeded or been lower than the previously set threshold. Yet still another "silence latch" is disclosed in Dubnowski et al, U.S. Pat. No. 4,015,088 and which adaptively establishes the threshold level depending on an initial operating interval and a maximum level experienced over the interval or on operator choice.

Nowhere, however, is the present real time compaction technique and/or apparatus disclosed and which technique and apparatus permits real time compaction of speech, independent of whether the input speech signal is analog or digital. The technique and apparatus is further adaptable for use in conjunction with other known compression and encoding techniques to minimize the amount of storage media required to contain a given amount of speech.

SUMMARY OF THE INVENTION

A method and apparatus for compacting, in real time, recorded speech by filtering periods of relative silence from the speech. The compaction apparatus essentially comprising a silence detector for detecting periods of relative silence; a sync and time code generator for producing sync and time code signals; and an input selector for ordering and selecting between speech and sync and time code signals that are to be stored in the speech recorder (e.g. magnetic or semiconductor memory).

The replay apparatus essentially comprising a time code signal extractor and comparator for detecting sync signals and extracting a real time clock signal from the speech; a silence generator for producing relative silence; and an output selector for ordering and selecting between silence and speech and replaying the speech in synchronization with the real time clock used to record the speech.

BRIEF DESCRIPTION OF THE DRAWINGS

FIG. 5 is a diagram of the representative waveforms produced by the various elements of the silence detector.

DESCRIPTION OF THE PREFERRED EMBODIMENT

Conceptually, the present apparatus and in particular the silence detector is designed on the assumption that in relative terms a vocal audio signal is distinguishable from background noise. The vocal signal being a continuously varying signal both in magnitude and in frequency and typically having a relatively long duration (i.e. greater than approximately 100 milliseconds). Background noise, which is resident in a vocal audio signal, on the other hand exhibiting more constant characteristics in that its magnitude and frequency remain relatively constant and that excursions of the noise signals are of a relatively short duration (i.e. less than 100 milliseconds). The present compaction/replay apparatus therefore takes advantage of these relative differences in signal characteristics by monitoring the magnitude and number of excursions of an incoming audio signal during a number of sampling periods to distinguish the vocal audio signal from silent periods (i.e. background noise) and deleting the silence from an encoded, compacted digital representation of the audio signal.

Figure 1:
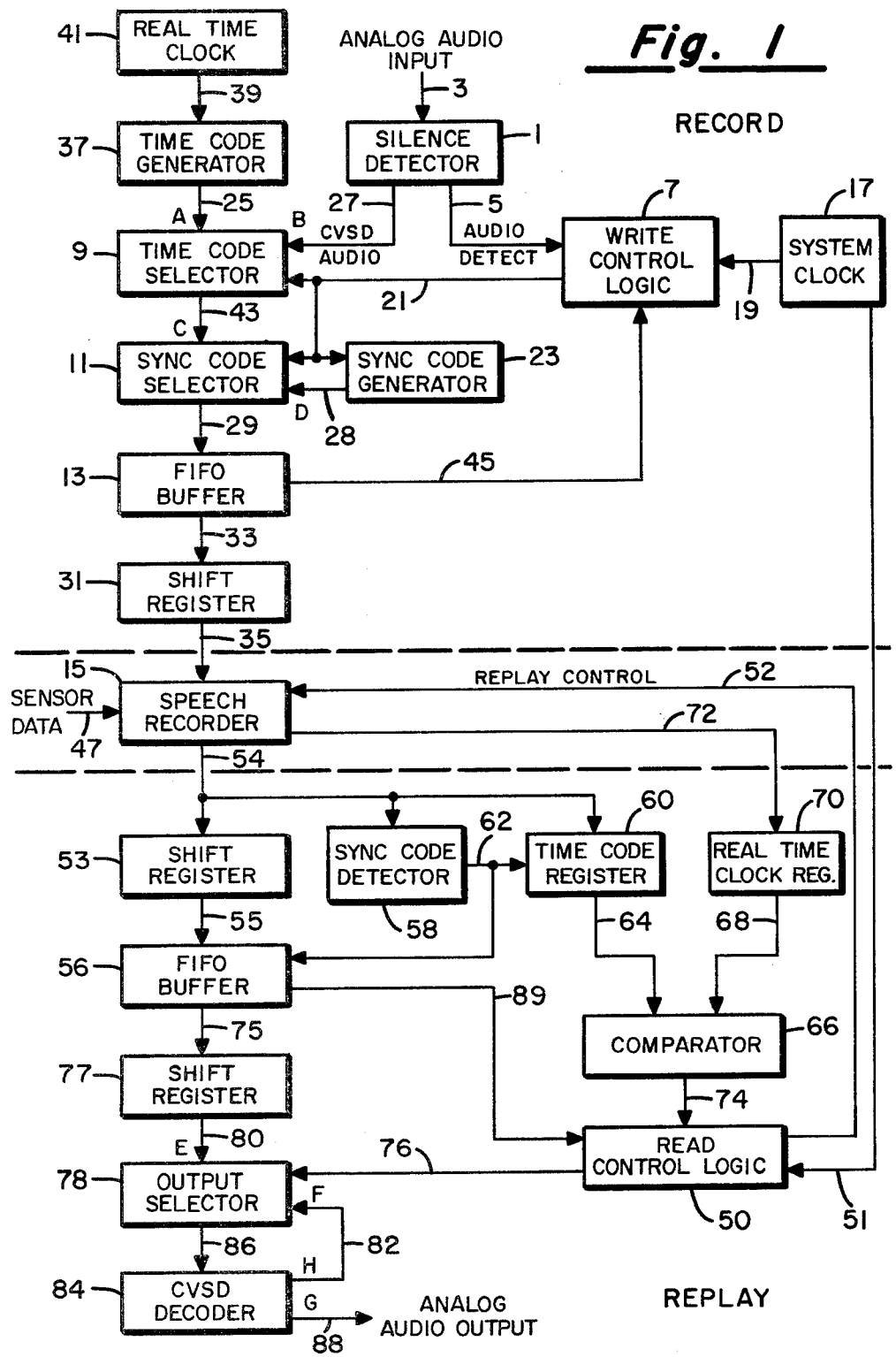
FIG. 1 is a block diagram of the compaction/replay apparatus.

Referring to FIG. 1 a block diagram of the present invention is shown and which generally discloses apparatus for digitally encoding and compacting an audio input signal, recording the encoded and compacted signal and then replaying, decoding and broadcasting the audio signal in substantially its original form. While one method of compaction (i.e. separating silence from vocal activity) has been described in the Boies et al disclosure, the present invention discloses improved apparatus for detecting the silent periods and for compacting the encoded signal in real time (i.e. with respect to the initialization of the system) as opposed to delta time (i.e. with respect to the previous sample). The apparatus of FIG. 1 performs these functions essentially via the aid of the silence detector 1, which will be described in greater detail hereinafter, and which acts to compare the incoming audio signal to a continuously adjusted threshold which is a function of the previously received audio signal so as to distinguish periods of relative silence in the audio signal. Upon detection of each audio segment, sync and time code markers are inserted into the encoded signal to indicate the start of an audio signal. Upon the ending of an audio signal no data will be stored in the speech recorder 15; and then upon the initiation of the next succeeding audio activity a new sync and time code marker will be inserted. Thus only the analog signal during each active audio period will be stored in the speech recorder 15 for later replay. Upon replay the sync and time code markers are then detected and the silent periods are reinserted so that a real time representation of the audio signal is reproduced, as opposed to a delta time representation.

Turning now to a discussion of the detailed operation of the speech compaction/replay apparatus of FIG. 1. Upon receipt of an incoming audio signal on conductor 3, the silence detector 1 acts to filter the silent periods from the audio signal. In particular, the silence detector 1 compares the incoming audio signal to a continuously adjusted threshold, which threshold is representative of the magnitude of previously sampled audio segments, to determine the number of times that the incoming audio signal exceeds the threshold. Depending upon the number of times within a predetermined sampling period that the level of the incoming audio signal exceeds the threshold signal, the silence detector will produce an audio detect signal. The audio detect signal is then transmitted via conductor 5 to the write control logic 7. The write control logic 7 in response to the audio detect signal then causes digital sync and time code markers to be produced and inserted prior to the incoming digitized audio signal. It is to be noted that while the apparatus will hereinafter be described with reference to a digitized audio signal it is to be recognized that the apparatus will work with pure analog audio as well. It should also be noted that for the present embodiment, the incoming audio signal on conductor 3 is encoded prior to storage in the speech recorder 15 into a continuously variable slope delta modulated (CVSD) format but may also be encoded into any other format (e.g. PCM, ADPCM, etc.).

Upon receipt of an audio detect signal, the write control logic 7 acts to produce the various control signals necessary to synchronize the activities of the time code selector 9, the sync code selector 11, the buffer 13 and the speech recorder 15. This synchronization is performed in response to the system clock signals produced via the system clock 17 and which are transmitted to the write control logic 7 on conductor 19. Thus upon receipt of an audio detect signal, a control signal is transmitted on conductor 21 to the time code selector 9, the sync code selector 11 and the sync code generator 23. This control signal causes the time code selector 9 to select its B port and the sync code detector 11 to select its D port. It is to be noted that because of this selection, the encoded data on conductor 27 will not be stored since it is blocked due to the selection of the D port and not the C port of the sync code selector 11.

The control signal on conductor 21 also causes the sync code generator 23 to begin to generate a sync code. It is to be noted though that while the sync code generator 23 and the sync code selector 11 are shown as separate functional blocks, in reality they are resident in a single 4 bit, serial to parallel shift register. Upon receipt of the control signal on conductor 21, the sync code generator 23 via conductor 28 causes the sync code selector 11 to produce 16 bit periods of binary ones which are shifted out on conductor 29 in parallel fashion 4 bits at a time. The 16 bit sync code signal is then received by the buffer 13 which is comprised of a first in first out (FIFO) memory and which acts to temporarily store the sync code, time code and digitized audio output until such time as it is full and at which time its contents will be shifted out in parallel via conductor 33 to shift register 31. The shift register 31 will then convert the buffer's parallel output to a serial output which can be recorded by the speech recorder 15. It is to be further recognized that the shift register 31 and buffer 13 may not be necessary for some designs, but for the present embodiment it is necessary because of the interface requirements to the storage medium of the speech recorder 15. The speech recorder 15 of the preferred embodiment is an MNOS BORAM, but may be replaced with any other suitable equivalent such as a CCD or MOS memory or a magnetic media. The specific choice for a speech recorder 15 would primarily depend on the application and the amount of digitized audio that it was desired to store.

Upon the shifting out of the sync code signal, the control logic 7 produces another control signal on conductor 21 which causes the selection of the A port of time code selector 9 and the C port of the sync code selector 11. It is to be noted that in the preferred embodiment the time code selector 9 is comprised of a 2 port, 1 bit multiplexer which selects between serial time code data on conductor 25 at port A and the encoded audio output of the silence detector 1 on conductor 27 at port B. The time code selector 9 then selects the time code which is resident in the time code generator 37 which is essentially comprised of a 24 bit shift register which continously receives via conductor 39 a real time clock signal from the real time clock 41. The real time clock being indicative of the elapsed time from the initiation of the audio input on conductor 3. Thus the selection of the A and C ports cause the time code corresponding to the time at which an audio signal is first detected to be shifted out of the time code generator 37 to the time code selector 9, to the sync code selector 11, and conductor to the buffer 13 and then the speech recorder 15.

Figure 4A:
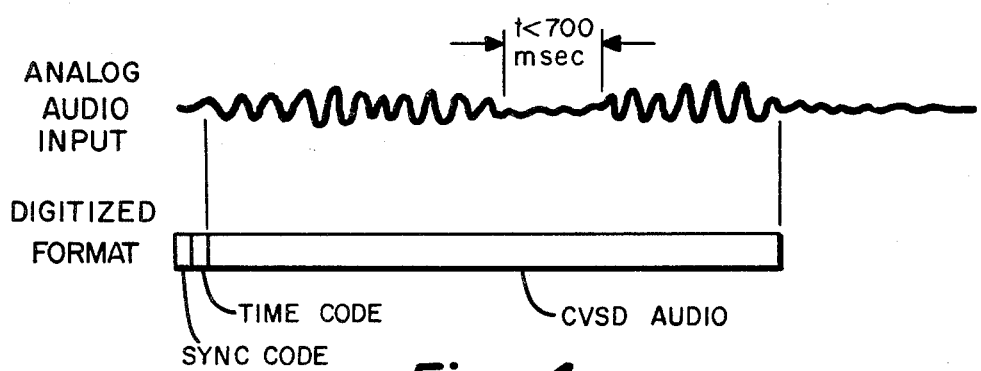
FIG. 4a is a diagram of a representative audio input and the corresponding format for a digitally encoded signal having an audio separation of less than 700 milliseconds.
Figure 4B:
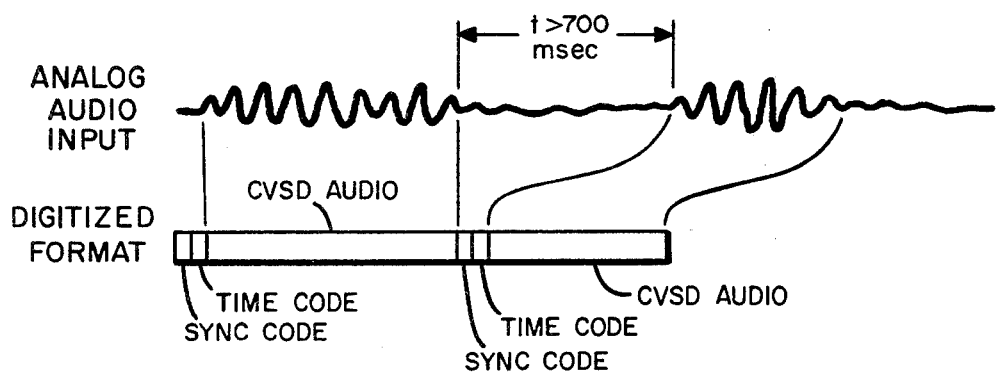
FIG. 4b is a diagram of a representative audio input and the corresponding digitally encoded signal having an audio separation of greater than 700 milliseconds.

Therefore each audio segment stored in speech recorder will be proceeded by a 16 bit sync code comprised of 16 ones and a 24 bit time code corresponding to the amount of time that has elapsed from initialization of the system. It should be noted also that the time code generator 37 is clocked for updating (signal not shown) at a rate of once per second. Reference is also called to FIGS. 4a and 4b wherein the recording format and corresponding relationship of the sync code, time code and encoded, digitized audio can be better seen. From FIGS. 4a and 4b it is also to be noted that for periods in which silence exists for less than 700 milliseconds, a digitized audio output is produced by the silence detector 1 and transmitted via conductor 27. For periods of silence greater than 700 milliseconds and during which neither a digitized audio output nor an audio detect signal are present, the new sync code and time code will be generated on the detection of the next succeeding audio segment.

Upon the transmission of the time code signal, the control logic 7 produces another control signal causing time code selector 9 to again select its B port and the encoded digitized audio output present on conductor 27. The digitized audio output will then be transmitted via conductors 43 and 29 and the C port of the time code selector 11 to the buffer 13 which again acts as the interface to the digitized audio output prior to transmission to the speech recorder 15. It is to be noted that the speech recorder 15 will always be in a write (i.e. record) mode, unless actively switched to a read mode, and will write so long as data is present on conductor 35. During the read mode (i.e. replay), a control signal on conductor 52 thus established the speed recorder 15 in the read mode and which inhibits further writing. It is to be further noted that for the present embodiment, the speech recorder 15 has the additional capability of receiving digitized sensor data containing a real time clock via conductor 47, independent of the audio storage activity. The sensor data essentially containing digitized data collected from various sensors which function concurrently with the audio input signal. An environment in which both audio signals and sensor data might typically be found would be in the cockpit of an airplane or similar command control environment. It is also to be noted that when the selfsame real time clock signals as were received into time code selector 25 from the time code generator 37 are contained within the sensor data, then such real time clock signals could be reproduced upon replay from samples—parts of the total—of the ditigalized audio (initially received for storage via conductor 35) and/or the digitalized sensor data (initially received for storage via conductor 47).

Upon replay of the encoded digitized audio from the speech recorder 15, the read control logic 50 produces a read control signal on conductor 52 which establishes the speech recorder 15 in a read mode. During the read mode the digitized audio will be transmitted via a conductor 54 to the serial to parallel shift register 53 and then to buffer 56 which again is a FIFO memory. During replay the digitized audio is monitored via the sync detector and control logic unit 58 and the time code register 60. Upon the detection of a sync code by the sync code detector 58, which comprises a counter and associated circuitry for detecting the 16 bits of binary ones, a control signal is produced on conductor 62. The control signal is then transmitted to the buffer 56 and the time code register 60 and which causes the buffer 56 to prevent the loading of the sync and time codes which if allowed to remain could cause spurious audio signals. The buffer also acts to prevent gaps in the replayed audio which would otherwise occur due the deletion of the sync and time codes.

The control signal on conductor 62 also causes the initiation of the time code register 60 which is comprised of a 24 bit shift register and which acts to load the time code contained in the replayed audio. The time code is then compared via conductor 64 in the digital comparator 66, which is comprised of a 24 bit digital comparator, to the digital clock signal on conductor 68 from the real time clock register 70. In the present application the real time clock signal is contained in the sensor data, as previously mentioned, and is now merely extracted from the speech recorder 15 via conductor 72 and stored in the 24 bit register which comprises the real time clock register 70. The extracted real time clock signal and the time code are thus compared by the comparator 66 and when an equality exists a control signal is produced on conductor 74. This control signal causes the read control logic 50 to produce another control signal on conductor 76 and which causes the output selector, which is comprised of a 1 bit multiplexer to select its E port and thus receive the digitized audio stored in buffer 56 via conductor 75 the parallel to serial shift register 77 and conductor 80.

Figure 4C:
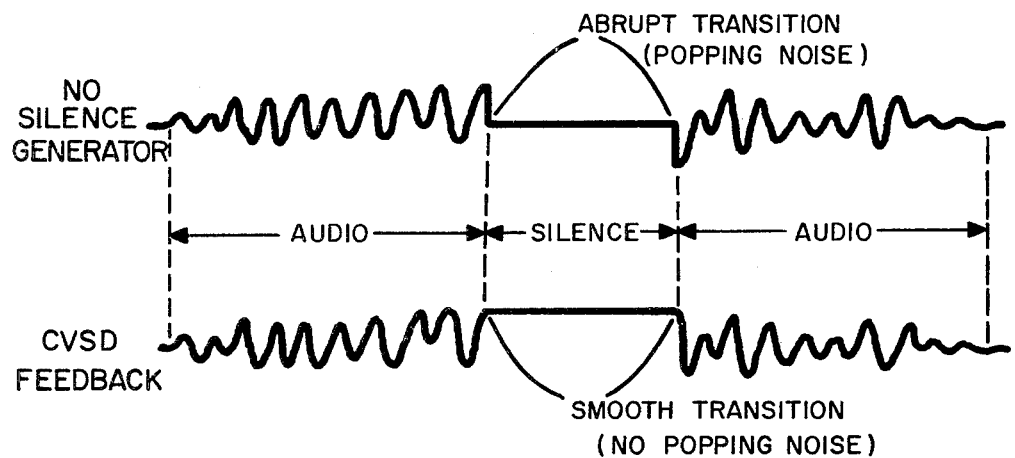
FIG. 4c is a diagram of reproduced audio signals with and without feedback on the CVSD decoder in the silence detector.

If the times in comparator 66, however, are not equal, the control signal produced on conductor 76 will cause the F port of the output selector 78 to be selected. Coupled to the F port via conductor 82 is a CVSD digital output from the H port of the CVSD decoder 84 corresponding to the level of the last transmitted analog audio sample. This CVSD output will then be transmitted via conductor 86 to the CVSD decoder 84 where it will be decoded and transmitted via the G port and conductor 88 and be replayed as silence. Referring to FIG. 4c and the comparison of two identical analog signals, one utilizing the adjusted CVSD silence level established via the H port of the CVSD decoder 84 and one using a predetermined (fixed) silence level, it is to be noted that in using a fixed level during periods of silence, the audio output would return to the predetermined level and upon detecting the next audio segment it would return to the then current level of the audio output. These abrupt transitions, however, cause a popping noise to occur in the audio output. Using the CVSD decoder 84 in the feedback fashion and adjusting the level of silence to the level of the last audio signal however ensures a smoother, less abrupt transition with no popping noises on replay.

During this silence generating condition too, a control signal will be transmitted from the read control logic 50 via conductor 52 to cause the speech recorder 15 to stop relay until a match is achieved in the comparator 66, when replay will be resumed upon detection of the match control signal on conductor 74. It is also to be noted that should buffer 56 become full a control signal will be transmitted via conductor 88 to the read control logic which will cause the speech recorder 15 to stop and permit the buffer 56 to continue transmitting its contents until such time as it can again begin to receive the digitized audio from the speech recorder 15.

Figure 2:
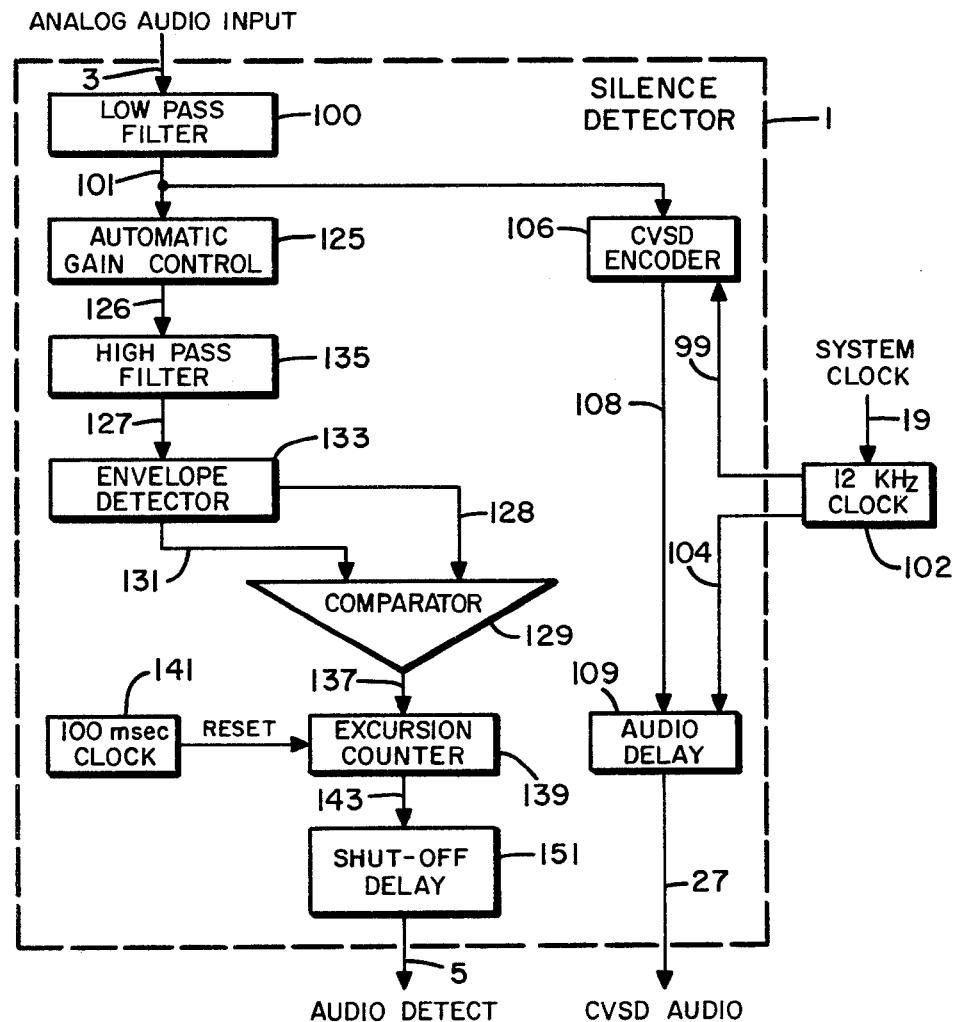
FIG. 2 is a block diagram of the silence detector of FIG. 1.
Figure 3:
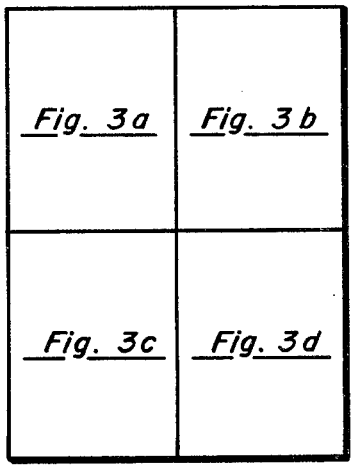
FIG. 3 comprised of FIGS. 3a, 3b, 3c and 3d is a detailed circuit diagram of the silence detector.
Figure 3A:
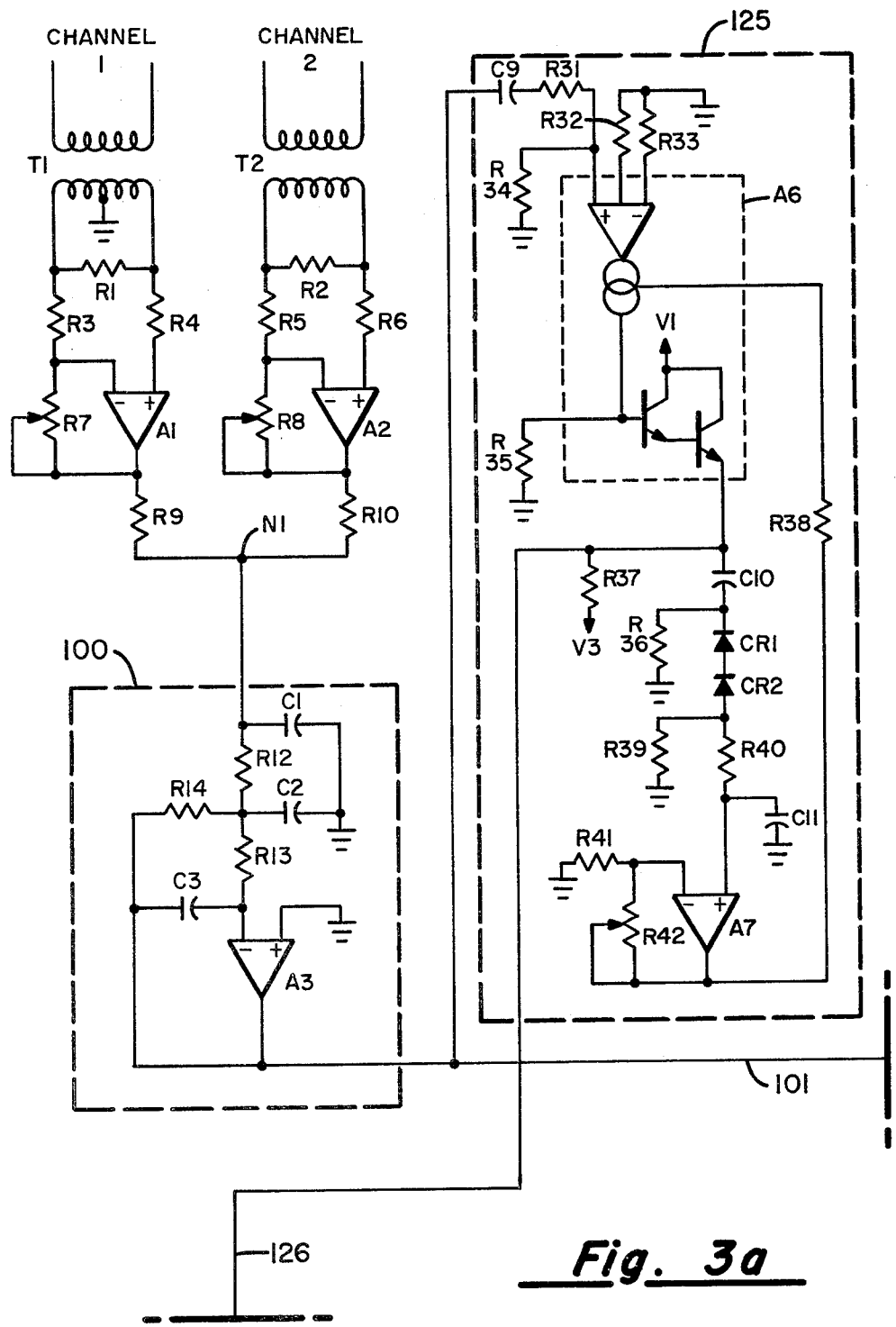
Figure 3B:
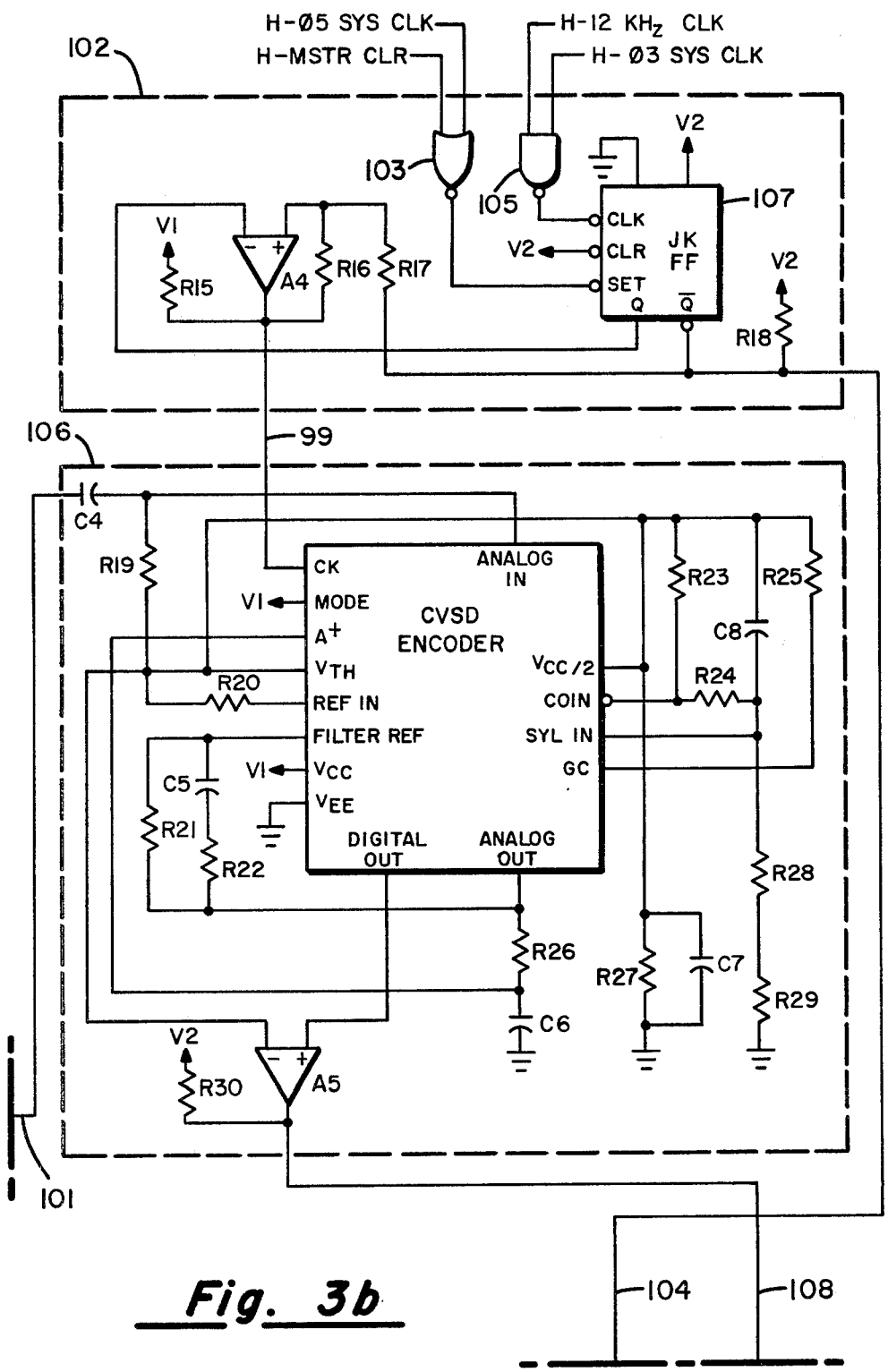
Figure 3C:
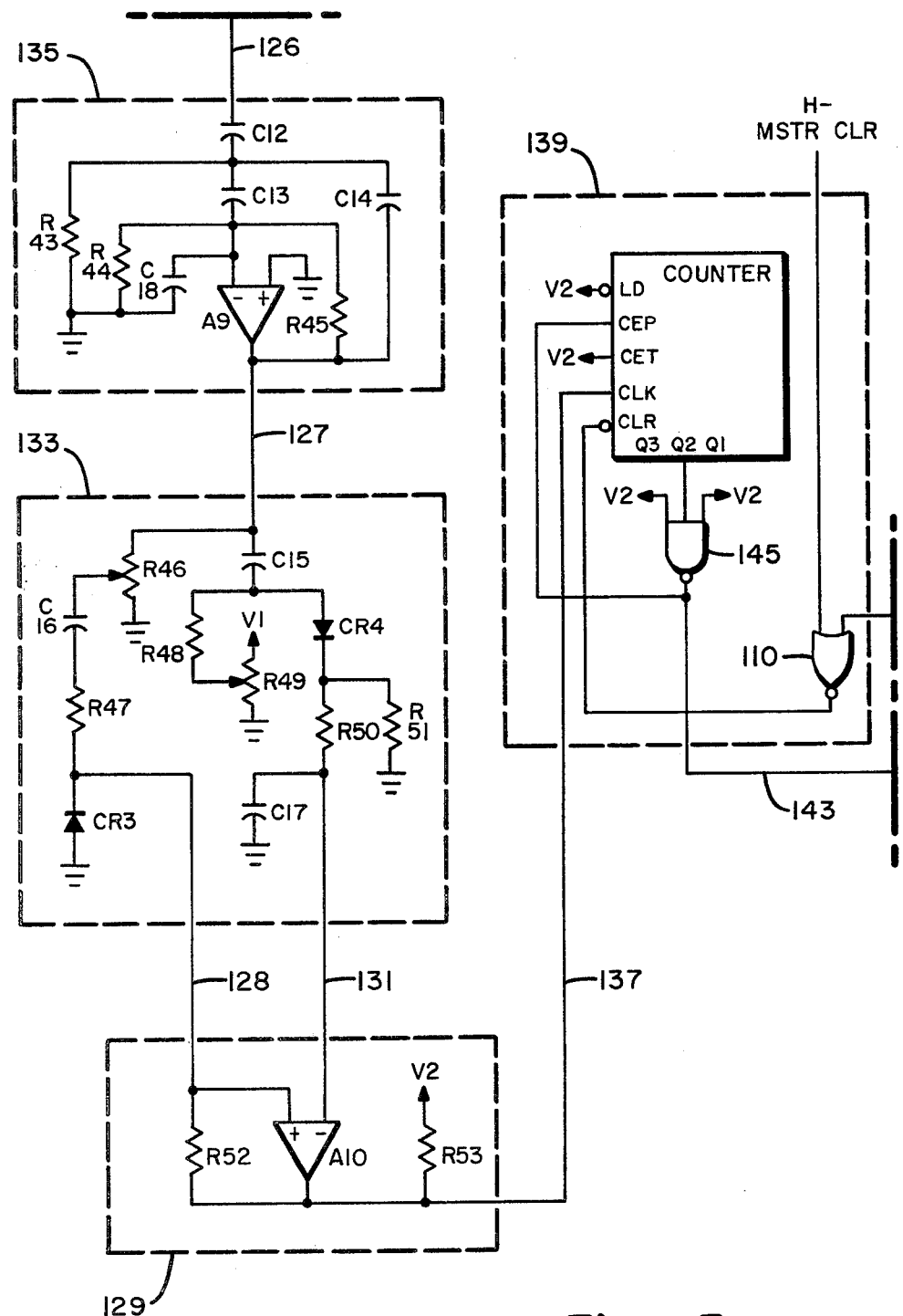
Figure 3D:
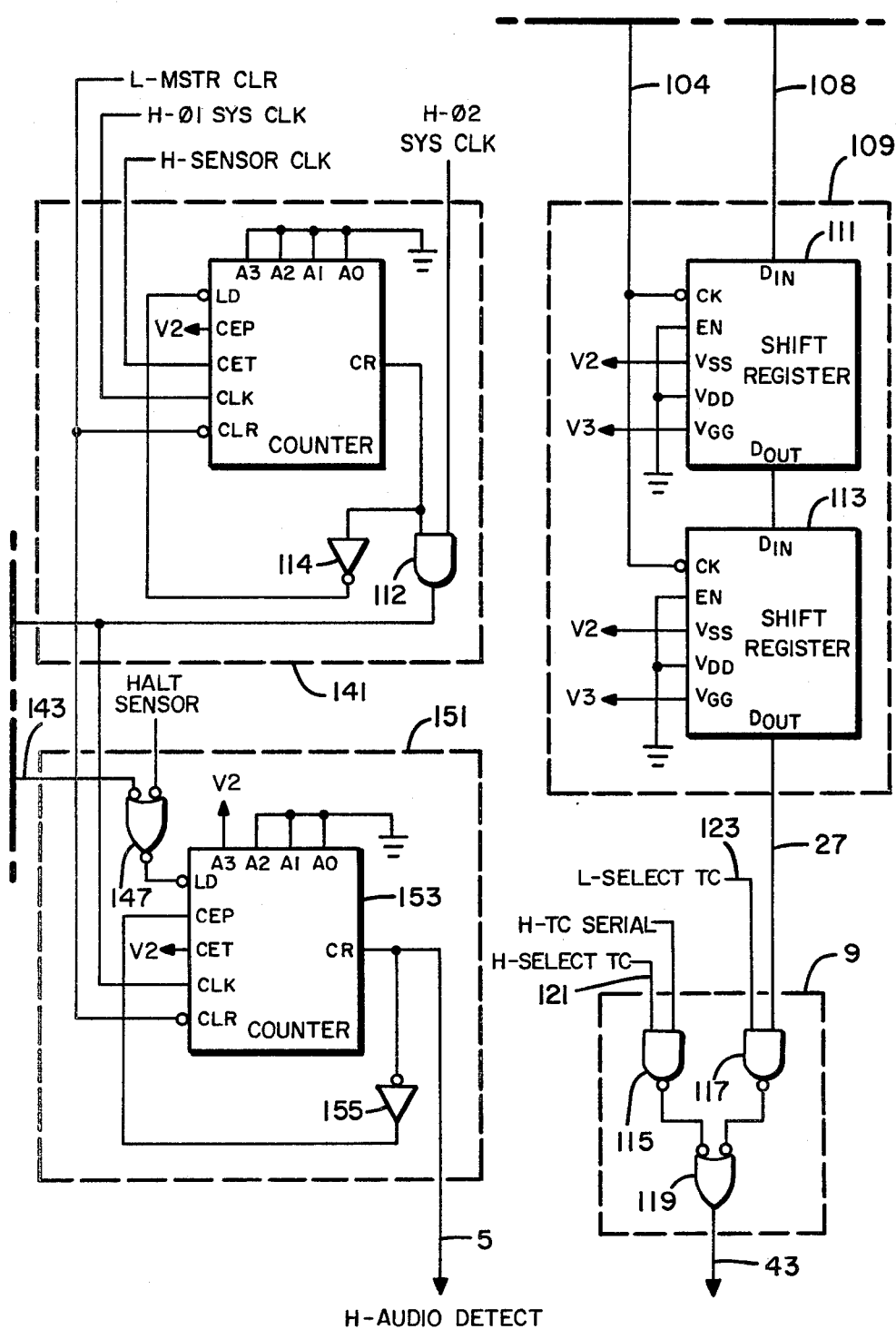

Referring now to FIG. 2 a block diagram of the silence detector 1 is shown and which will now be discussed in detail with respect to the individual blocks and FIG. 3 wherein the detailed circuitry of each of the block elements is shown. From FIG. 3 it is to be noted that two channels are provided for the audio input and over which channels an audio signal (i.e. voice for the preferred embodiment) is received and transformer coupled to the silence detector. It is thus possible for audio to be received on each of the channels concurrently and which audio signals are summed at node N1. Looking to one of the channels in particular, the resistor R1 is used to terminate the transformer T1 and the resistor combination of R3, R4 and R7 acts to establish the gain for the operational amplifier A1. Thus the audio signals are individually received and amplified to restore the signal to levels compatible with the silence detector 1.

Upon being received, the audio signal is then low pass filtered via the 3000 hertz low pass filter 100 which is comprised of capacitors C1, C2 and C3, resistors R12, R13 and R14 and operational amplifier A3. The filter is thus an active filter which acts to filter high frequency background noise from the received analog audio and which improves the quality of the received signal prior to encoding. Such filtering also serves to improve the signal-to-noise ratio of the CVSD encoder 106 and to prevent frequency aliasing.

It should also be noted that the silence detector is clocked at a 12 kilohertz clock rate which is provided via clock 102. Clock 102 receives its general timing instructions from the main system clock 17 via NOR gate 103 and NAND gate 105 and causes the JK flip-flop 107 to produce complementary clock signals on its Q and $\bar{Q}$ outputs. The Q output being amplified via amplifier A4 and used to clock the CVSD encoder 106. The complementary $\bar{Q}$ clock signal being used to clock the CVSD encoded audio into the audio delay shift registers 109 and which will be described in more detail hereunder.

Upon filtering the high frequency noise from the incoming audio signal, the filtered audio signal is impressed on the analog input of the CVSD encoder 106, which is comprised of a Motorola Part No. MC3517 and which with its associated circuitry acts to produce a CVSD encoded audio signal. The CVSD encoded audio is then transmitted via conductor 108 to the audio delay element 109 which is comprised of two series coupled shift registers 111 and 113. The shift registers 111 and 113 then act to delay the CVSD encoded audio by a period of approximately 100 milliseconds which is the amount of time that is required to sample the analog audio signal and determine whether or not silence or audio is present. The delayed CVSD signal is then transmitted on conductor 27 to the time code selector 9. It is to be noted that the time code selector 9, previously referred to as a two port multiplexer, is in fact comprised of AND gates 115 and 117 and the low input OR gate 119. Depending upon which of the complementary time code selector conductors 121 and 123 are active, either the time code contained within the time code generator 37 or the CVSD encoded audio output will be transmitted via conductor 43 to the sync code selector 11 and ultimately speech recorder 15.

While the above description specifies the events which occur relative to the CVSD encoded audio, it is to be recalled that occurring in parallel with the encoding of the analog audio is the sampling of the analog audio to determine whether or not silence or an audio signal is present. Therefore returning to conductor 101 and the filtered analog audio signal thereon, it is to be noted that the filtered analog audio signal is also coupled to the automatic gain control (AGC) element 125. The automatic gain control is essentially performed via the transconductance amplifier A6 (i.e. National Semiconductor Part No. LM-13600) and the associated feedback control circuitry comprised of capacitor C10, diodes CR1 and CR2, amplifier A7 and resistors R36, R39, R40, R41, R42, and R38. The transconductance amplifier A6 is adjustable and its gain in the present embodiment has been established to produce a relatively constant audio signal over an analog audio input signal amplitude range from 0.1 to 5 volts. Thus the analog audio signal appearing on conductor 126 is controlled in magnitude prior to comparison in comparator 129 with the threshold envelope on conductor 131 from the envelope detector 133. The AGC adjusted audio signal is then impressed on a 1000 hertz active high pass filter 135 which acts to filter any low frequency noise from the analog audio signal. Thus prior to comparison, the analog audio signal has been filtered twice and only those frequencies between 1000 and 3000 hertz will be sampled to determine whether or not audio is present.

Upon filtering the background noise from the gain controlled audio signal, the filtered signal is impressed upon the envelope detector 133 and within which the signal is impressed on two parallel paths. The first path comprised of resistors R46 and R47, capacitor C16 and diode CR3 and which acts to AC couple the filtered audio signal to the comparator 129 and to halfwave rectify that signal. The second path comprising capacitors C15 and C17, diode CR4 and resistors R48, R49, R50 and R51 acts to integrate the filtered audio signal and produce the continuously adjusted threshold envelope voltage which is used to determine whether or not an audio signal is present. In particular resistors R48 and R49 act to establish a DC offset to the audio signal prior to the halfwave rectification by diode CR4. The halfwave rectified signal is then integrated by the RC combination of resistors R50 and R51 and capacitor C17, and it is the charge on capacitor C17 that establishes the threshold envelope voltage. It is to be noted also that the resistors R50 and R51 are selected such that their combination will produce approximately a one millisecond charge time on capacitor C17 and a 10 millisecond discharge time, thus ensuring that each peak of the audio signal will be compared to the average level of the most recently received peaks.

The various signals of each of the paths are then compared at the analog comparator A10. The analog comparator A10 then operates in the fashion that if the peak audio signal on the first path increases relative to the threshold envelope established on the second path, the output on conductor 137 will go active. Due to the RC time constant though, the increased audio signal also causes a delayed increase in the threshold envelope, which in turn forces the comparator output inactive as the analog audio peak level decays prior to the next peak. Thus producing a pulsed output on conductor 137, reference FIG. 5.

Referring again to FIG. 5, the excursion counter 139 responding to the pulsed output of comparator 129 counts the individual pulses over a 100 millisecond period. The 100 millisecond period is established via clock 141 which is under the control of the system clock 17. Thus as the pulsed output of comparator 129 clock the excursion counter 139, a record is kept of the number of times that the peak level of the analog audio signal exceeds the threshold envelope level. If within each 100 millisecond period the counter meets or exceeds a predetermined count (i.e. typically a count of 4), the counter will overflow and indicate the overflow condition by producing a pulse.

Recalling that vocal audio is a relatively time variant signal with respect to background noise, vocal activity will cause excursion counter 139 to overflow, whereas background noise will cause few pulses from comparator 129 and which typically are insufficient to overflow the counter, thus ensuring that only audio activity will be detected. The overflow condition of excursion counter 139 is detected by NAND gate 145 which produces and impresses a logic low on the low input/output OR gate 147. The OR gate 147 in turn produces a logic low pulse that is impressed on the shutoff delay element 151.

It should also be noted that the OR gate 147 receives as one of its inputs a halt sensor logic signal which acts to maintain an audio detect signal if sensor data (i.e. the real time clock signal resident in real time register 70) is for some reason not being received. This ensures that loss of the real time clock in the sensor data signal will not prevent real time replay of the audio signal.

Also coupled to the logic low output of OR gate 147 is the shutoff delay element which is comprised of counter 153, and inverter 155. The shutoff delay element 151 responds to the logic low pulse from OR gate 147 and causes the counter 153 to count at the clock rate of clock 141 for approximately 700 milliseconds and during which time the audio detect signal will be maintained on conductor 5. If additional counter pulses are received during this 700 millisecond period, as would be indicative of continuing vocal audio activity, the counter 153 will reload itself and begin to count anew until interrupted or until the 700 milliseconds has expired and at which time inverter 155 would change states and the audio detect signal would go low, thus indicating that no audio signal was being received. By incorporating a 700 millisecond delay in this fashion, momentary decreases in the amplitude of the received analog audio signal (e.g. as is common with certain vocalized vowel sounds or at the end of words or sentences) do not affect the encoded audio recorded in the speech recorder 15. Therefore, if the inactivity is less than 700 milliseconds, it will be recorded in the speech recorder 15, reference FIGS. 4a and 4b.

While the present invention has been described with respect to the preferred embodiment thereof, it is to be recognized that variations thereof may suggest themselves to those having skill in the art. It is therefore asserted that the presently claimed invention should not be interpreted narrowly but rather broadly within the spirit and scope of the following claims.

What is claimed is:

1. A method for compacting and recording an analog signal in real time, comprising the steps of:
   distinguishing silent periods from audio periods in a received said analog signal;
   first recording a sync code indicative of the start of said audio periods, upon the detection of each said audio period;
   second recording a time code indicative of the total elapsed real time since the initialization of the steps of this method of a compacting system; upon detection of each said audio period; and
   third recording only the analog signal present during said audio periods;
   whereby the amount of storage media necessary to store said analog signal can be minimized; and whereby said analog signal can be recorded with reference to said total elapsed real time.

2. A method as set forth in claim 1 including the step of digitally encoding the analog signal of said audio periods prior to the recording thereof.

3. A method as set forth in claim 1 further comprising the step of:
   fourth recording real time clock sensor data continuously;
   thereby coincident with said first recording, said second recording, and said third recording of the analog signals of said audio periods;
   thereby facilitating the real time synchronization of said silent and said audio periods upon replay.

4. A method for replaying analog signals recorded with compaction in real time comprising the steps of:
   detecting successive ones of sync codes and real time clock codes accompanying an audio period of said analog signal recorded with compaction in real time, plus continuously recorded successive ones of real time clock sensor data;
   comparing successive ones of said real time clock codes to successive ones of said real time clock sensor data, upon detection of each said sync code; and
   first replaying said analog signal recorded with compaction in real time each time a match occurs between successive said real time clock codes and said real time clock sensor data;
   thereby synchronizing said audio periods of said analog signal recorded with compaction in real time with said real time clock sensor data.

5. A method as set forth in claim 4 further comprising the step of:
   second replaying silence during the real time corresponding to said detected continuously recorded successive ones of real time clock sensor data until each successive said match resultant in said first replaying;
   thereby replaying a substantially identical analog signal to that which was recorded as said analog signal recorded with compaction in real time.

6. A method as set forth in claim 5 wherein said silence is replayed at an amplitude substantially identical to the amplitude of the analog signal present upon termination of the previous comparison, thereby minimizing transitions between the amplitudes of the analog signal between successive comparisons.

7. Apparatus for compacting and recording an analog signal in real time comprising:
   silence detection means for monitoring and distinguishing audio and silent periods within said analog signal;
   means for producing a sync code signal when an audio period is detected;
   means for producing a time code signal reflecting the total elapsed real time since initiation of the apparatus when an audio period is detected;
   means for recording said sync and said time code signals and said analog signal; and
   control means for ensuring that only the analog signal occurring during each audio period plus the associated sync and time code signals to said each audio period are recorded;
   thereby deleting recording of said silent periods and minimizing the amount of recording media necessary to record said analog signal.

8. Apparatus as set forth in claim 7 wherein said silence detection means comprises:
   means for halfwave rectifying said analog signal to produce a halfwave rectified analog signal;
   means for integrating said analog signal to produce a continuously adjusted threshold envelope signal;

means for comparing said threshold envelope signal with said halfwave rectified analog signal; and means for counting the number of times said analog signal exceeds said threshold envelope and depending on the count at the end of each sampling period producing a control signal indicative of silence or the detection of an audio period.

9. Apparatus as set forth in claim 8 including means for filtering said sampled analog signal of background noise.

10. Apparatus as set forth in either claim 8 or claim 9 wherein said sampling means includes means for automatically controlling the level of said sampled analog signal.

11. Apparatus as set forth in claim 10 including means for CVSD encoding said analog signal.

12. Apparatus as set forth in claim 7 including means for recording a real time clock signal during the compaction of said analog signal.

13. Apparatus as set forth in claim 8 wherein said sampling means includes shut-off delay means for delaying the termination of each audio period, thereby permitting the recording of silent periods of a duration less than the shut-off delay.

14. Apparatus for replaying a real time compacted analog signal, comprising:
  means for detecting a sync code, and a time code in a real time compacted analog signal;
  means for producing a real time clock signal;
  means for comparing said time code to said real time clock signal to determine when said audio periods should be replayed, thereby synchronizing said audio periods within the replayed analog signal; and
  means for replaying silence upon termination of each audio period.

15. Apparatus as set forth in claim 14 wherein said means for replaying silence replays each silent period at an amplitude substantially identical to the amplitude of the replayed analog signal upon termination of the preceding audio period.

* * * * *